(12) United States Patent
Kaneura et al.

(10) Patent No.: US 6,675,598 B2
(45) Date of Patent: Jan. 13, 2004

(54) VEHICLE AIR CONDITIONER WITH ARRANGEMENT STRUCTURE OF FACE DUCTS

(75) Inventors: Shinya Kaneura, Kariya (JP); Hitoshi Kondo, Kariya (JP); Kouji Matsunaga, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/435,854

(22) Filed: May 12, 2003

(65) Prior Publication Data

US 2003/0213258 A1 Nov. 20, 2003

(30) Foreign Application Priority Data

May 15, 2002 (JP) ........................................ 2002-140616

(51) Int. Cl.$^7$ ................................................. B60H 1/32
(52) U.S. Cl. ........................ 62/244; 454/143; 454/145
(58) Field of Search ................... 62/239, 244; 454/143, 454/145, 156, 159, 161

(56) References Cited

U.S. PATENT DOCUMENTS

| | | | | |
|---|---|---|---|---|
| 5,934,989 A | * | 8/1999 | Yamamoto | 454/156 |
| 6,148,904 A | * | 11/2000 | Tsunooka et al. | 165/43 |
| 6,261,172 B1 | * | 7/2001 | Shibata | 454/121 |
| 6,351,962 B1 | * | 3/2002 | Mizutani et al. | 62/244 |
| 6,382,518 B1 | * | 5/2002 | Shibata et al. | 237/12.3 B |
| 6,398,638 B1 | * | 6/2002 | Shibata et al. | 454/69 |
| 6,415,857 B1 | * | 7/2002 | Nakamura et al. | 165/204 |
| 6,427,771 B1 | * | 8/2002 | Kako et al. | 165/204 |
| 6,463,998 B1 | * | 10/2002 | Shindo | 165/204 |
| 6,598,670 B1 | * | 7/2003 | Hashimoto et al. | 165/204 |
| 6,599,182 B1 | * | 7/2003 | Schwarz | 454/156 |

FOREIGN PATENT DOCUMENTS

JP 402038133 A * 2/1990

* cited by examiner

*Primary Examiner*—William C. Doerrler
*Assistant Examiner*—Mohammad M. Ali
(74) *Attorney, Agent, or Firm*—Harness, Dickey & Pierce, PLC (57) ABSTRACT

An air conditioning unit of a vehicle air conditioner is disposed inside a dashboard approximately at a center portion in a vehicle right-left direction. Center face air outlets are provided in the dashboard opposite to right and left end sides of the air conditioning unit, and center face openings are provided in the air conditioning unit at right and left end sides in a vehicle right-left direction. Therefore, the center face outlets on the dashboard and the center face openings of the air conditioning unit can be connected by center face ducts each of which extends substantially straightly. Accordingly, pressure loss of air in the center face ducts can be reduced, and an air amount blown from the center face air outlet into the passenger compartment can be effectively increased.

7 Claims, 11 Drawing Sheets

VEHICLE AIR CONDITIONER WITH ARRANGEMENT STRUCTURE OF FACE DUCTS

CROSS REFERENCE TO RELATED APPLICATION

This application is based on Japanese Patent Application No. 2002-140616 filed on May 15, 2002, the disclosure of which is incorporated herein by reference.

BACKGROUND OF THE INVENTION

1. Field of the Invention

The present invention relates to a vehicle air conditioner with an arrangement structure of face ducts. More particularly, the present invention relates to arrangement positions of face opening portions provided in an air conditioning unit of the vehicle air conditioner.

2. Description of Related Art

In a conventional vehicle air conditioner, an air conditioning unit for controlling temperature of air blown from air outlets into a passenger compartment is disposed at an approximate center inside a dashboard (i.e., an installment board portion including an instrument panel) in a vehicle right-left direction. At an approximate center area on the dashboard, two center face air outlets are provided to be arranged in the vehicle right-left direction. At two end portions of the dashboard in the vehicle right-left direction, side face air outlets are provided, respectively. On the other hand, at an upper part on a vehicle rear surface of an air conditioning case, four opening portions are arranged in the vehicle right-left direction. Two center opening portions among the four are center face opening portions, and the other two opening portions at two sides of the center face opening portions in the vehicle right-left direction are side face opening portions.

The center face opening portions of the air conditioning unit and the center face air outlets on the dashboard of the vehicle are connected by center face air ducts, and the side face opening portions of the air conditioning unit and the side face air outlets on the dashboard of the vehicle are connected by side face air ducts, respectively. Because the center face air outlets are provided opposite to the center face opening portions, the center face opening portions and the center face air outlets can be connected by short and straight center face ducts, respectively. In such structure, flow resistance in the center face ducts is made smaller, and a required flow amount of conditioned air blown toward a face area in the passenger compartment can be readily ensured.

Figure 13:
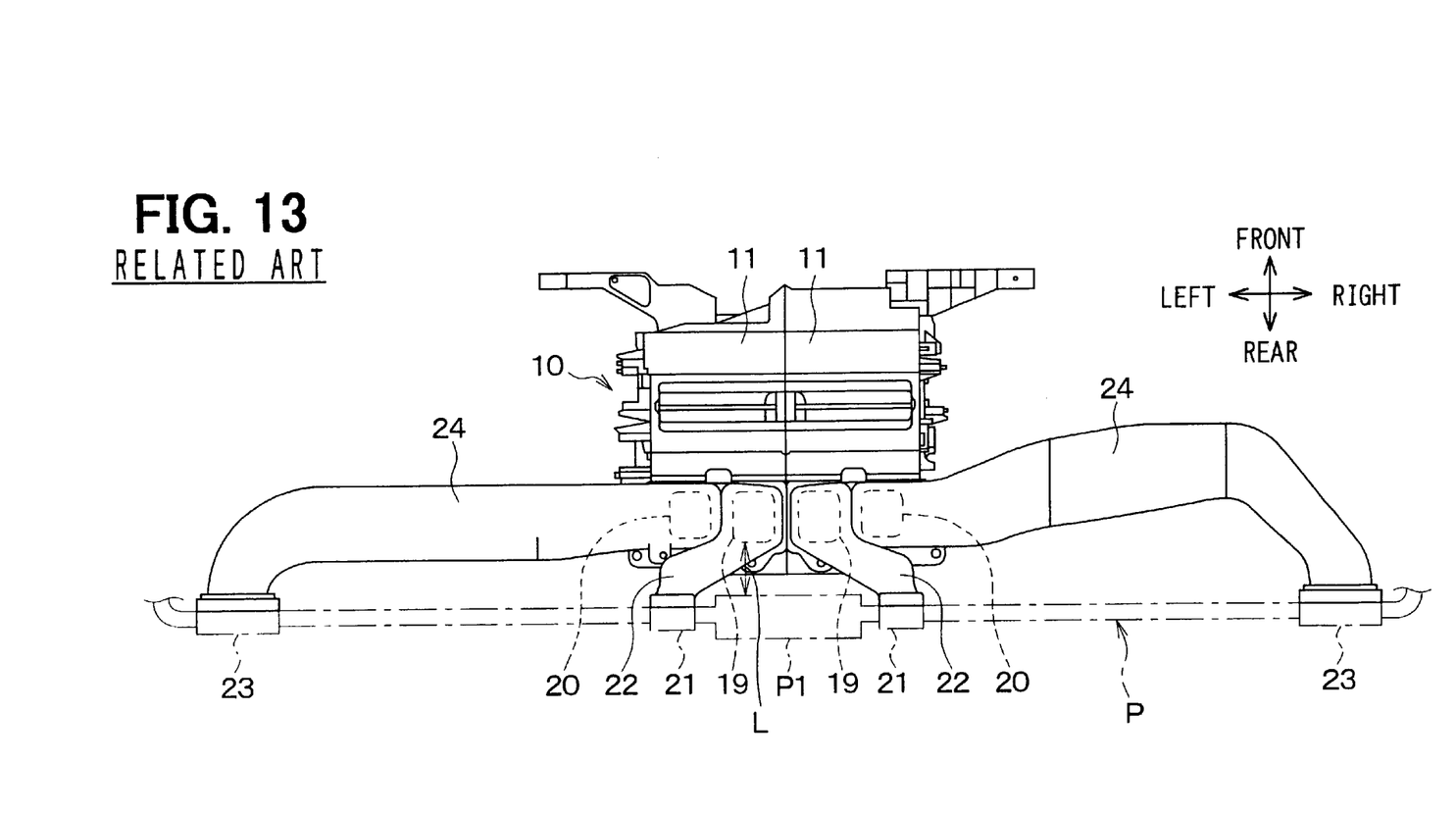
FIG. 13 is a top view showing a layout of an air conditioning unit and face ducts in a related art.
Figure 14:
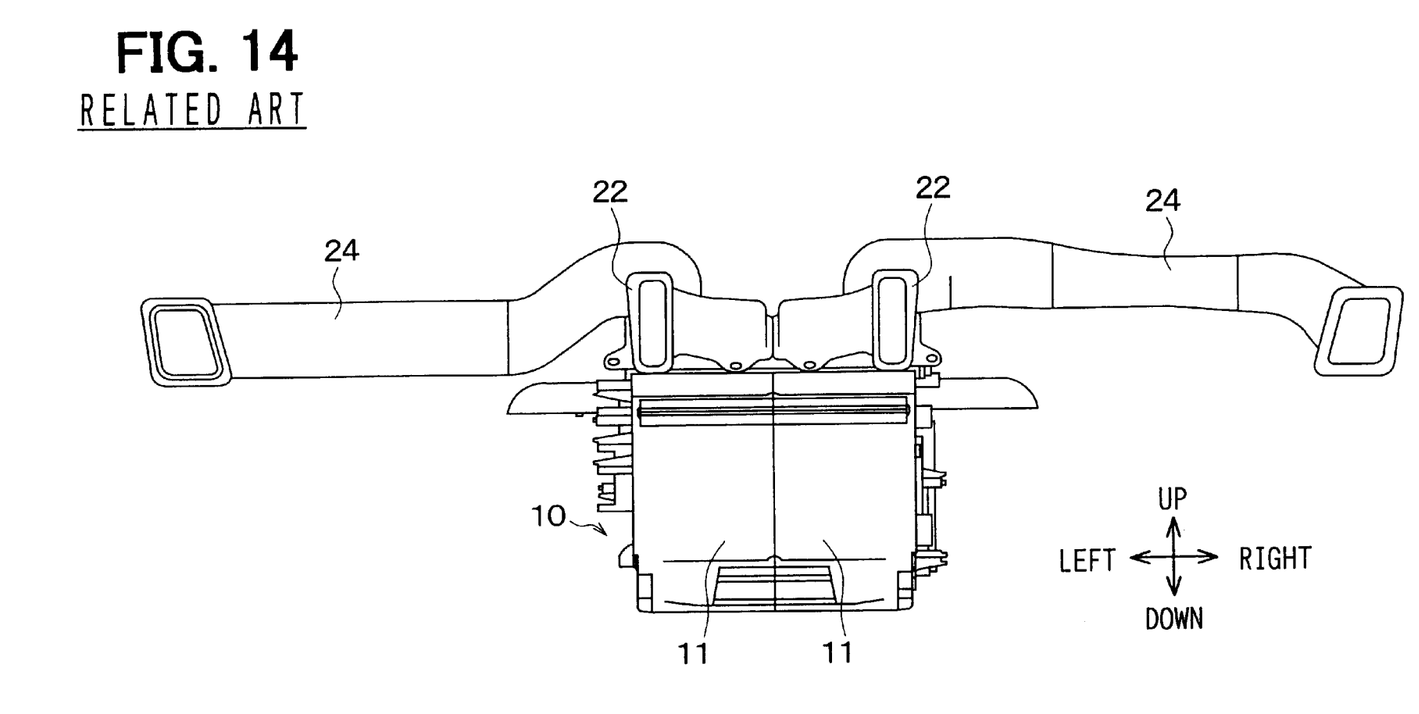
FIG. 14 is a front view of FIG. 13.

However, when the center face ducts are disposed in a layout shown in FIGS. 13, 14, the flow amount of the conditioned air blown toward the face area of the passenger compartment decreases due to an increase of the flow resistance in the center face ducts. The layout shown in FIGS. 13 and 14 is experimentally set and is studied by inventors of the present invention. As shown in FIGS. 13 and 14, at an upper part on a vehicle rear surface of an air conditioning case 11, two center face opening portions 19 and two side face opening portions 20 are arranged in a line in the vehicle right-left direction. On the other hand, center face air outlets 21 provided in the dashboard P are offset from the center area in the vehicle right-left direction, in consideration of the design of the dashboard P. Generally, an interval L (shown in FIG. 13) between the face opening portions 19, 20 and a center portion P1 of the dashboard P in the vehicle front-rear direction is small (e.g., about 30 mm).

Accordingly, the center face ducts 22 need to be formed with extremely curving shapes (shown in FIG. 13) within the small interval L in order to connect the center face openings 19 and the center face air outlets 21. Consequently, the flow resistance is increased in the center face ducts 22, and the required flow amount of the conditioned air blown toward the face area of the passenger compartment cannot be ensured.

SUMMARY OF THE INVENTION

In view of the above-described problems, it is an object of the present invention to reduce flow resistance in center face ducts, in a vehicle air conditioner having center face air outlets that are provided in a dashboard of the vehicle at two end sides of an air conditioning unit in a vehicle right-left direction.

It is another object of the present invention to provide an arrangement structure of face ducts through which conditioned air from an air conditioning unit is blown toward an upper side of a passenger compartment in a vehicle air conditioner.

According to the present invention, an air conditioner for a vehicle includes an air conditioning unit for conditioning air to be blown into a passenger compartment. The air conditioning unit is disposed behind the dashboard substantially in a center area in a vehicle right-left direction. Further, the air conditioning unit has at least two first face openings through which air conditioned in the air conditioning unit flows toward a center upper side in the passenger compartment, and at least two second face openings through which air conditioned in the air conditioning unit flows toward right and left upper sides in the passenger compartment. In the air conditioner, the first face openings of the air conditioning unit are coupled to first face outlets that are provided in the dashboard at positions adjacent to a center portion in the vehicle front-rear direction, and the second face openings of the air conditioning unit are coupled to second face outlets that are provided in the dashboard at right and left end sides. In addition, the first face outlets are arranged in the dashboard at positions opposite to right and left end sides of the air conditioning unit, and the first face openings are provided in the air conditioning unit at the right and left end sides in the vehicle right-left direction. Accordingly, the center face ducts for connecting the first face openings and the first face outlets can be formed substantially straightly without a great bending. Thus, pressure loss in the first face ducts can be reduced, and a flow amount of air toward the center upper side in the passenger compartment can be effectively increased.

Preferably, the second face openings are provided in the air conditioning unit at a center area in the vehicle right-left direction, and the first face openings are provided in the air conditioning unit at right and left sides of the second face openings in the vehicle right-left direction. Therefore, the first face openings can be provided opposite to the first face outlets, and the arrangement structure of the first face ducts can be made simple. Thus, each of the first face ducts can extend substantially straightly in a vehicle front-rear direction.

Preferably, the second face ducts have crossing portions which pass above the first face ducts to cross extending directions of the first face ducts, and the second face ducts have end opening portions that are connected to the second face openings inside the crossing portions in the vehicle right-left direction. Therefore, pressure loss in the second face ducts can be restricted, and the arrangement structure of the first face ducts and the second face ducts can be made simple. Further, the air conditioning unit can be effectively used for a vehicle having at least one of a navigation system, an air conditioning operation panel, a radio and an ashtray at the center portion of the dashboard.

The air conditioning unit includes an air conditioning case defining an air passage through which air is introduced into the first and second face openings, and a partition plate that is disposed in the air conditioning case to partition the air passage into a first passage and a second passage in the vehicle right-left direction. In this case, the air passage has a normally open passage through which air conditioned in the air conditioning unit is always introduced to the second face openings, and the normally open passage is provided in the partition plate. Because the normally open passage is provided in the partition plate, the die structure for molding the air conditioning case can be made simple.

Further, in the present invention, it is possible to provide the second face openings in the air conditioning unit outside the first face openings in the vehicle right-left direction. For example, the second face openings are provided on right and left side wall surfaces of the air conditioning case.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PRESENTLY PREFERRED EMBODIMENT

A preferred embodiment of the present invention will be described hereinafter with reference to the accompanying drawings.

A vehicle air conditioner according to this embodiment include an interior apparatus disposed inside a passenger compartment. The interior apparatus of the vehicle air conditioner broadly includes an air conditioning unit 10 shown in FIGS. 1–6, and an air blower unit (not shown) for sending air to the air conditioning unit 10. The air conditioning unit 10 is generally mounted in the vehicle to correspond to the front-rear direction, the right-left direction and the up-down direction in the drawings.

Inside a dashboard P (shown in FIG. 1) installed in a front part of the passenger compartment of the vehicle, the air blower unit is disposed to be offset from a center portion toward a front passenger's seat in the vehicle right-left direction. On the other hand, the air conditioning unit 10 is disposed inside the dashboard P at an approximate center portion in the vehicle right-left direction. Moreover, because the air conditioning unit 10 of this embodiment is designed for a vehicle having a left steering wheel, the air blower unit is disposed inside the dashboard at the right side of the air conditioning unit 10.

The air blower unit has an inside/outside air switching box for switching and introducing inside air (i.e., air inside the passenger compartment) or outside air (i.e., air outside the passenger compartment), and a centrifugal air blower for blowing air introduced through the inside/outside switching box.

The air conditioning unit 10 has an air conditioning case 11 made of resin, and forms therein an air passage through which air is blown into the passenger compartment. The air conditioning case 11 includes a left side case 11a and a right side case 11b. By tightening the left side case 11a and the right side case 11b together using a tightening means such as a screw, the air conditioning case 11 is formed.

Figure 3:
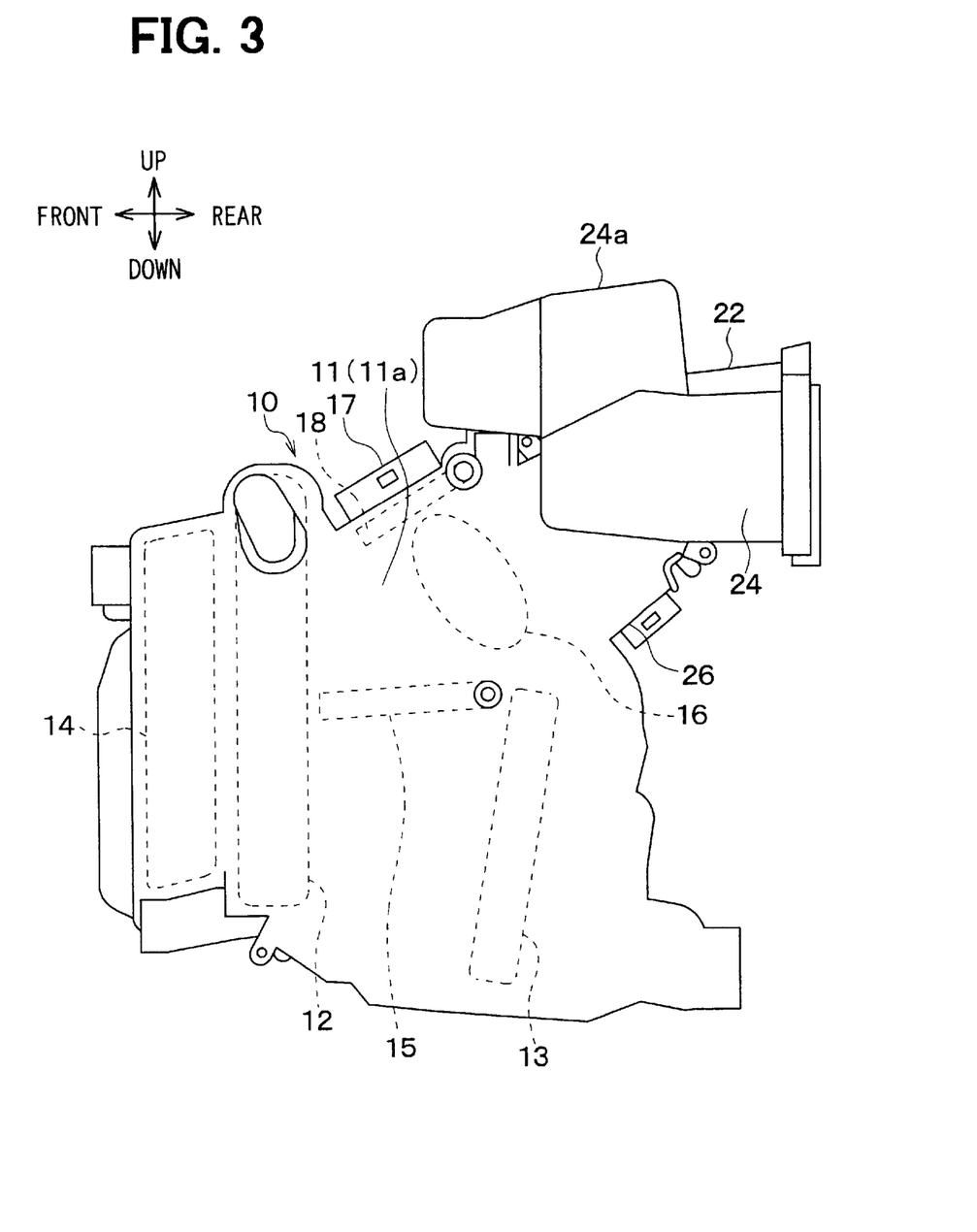
FIG. 3 is a left side view showing the air conditioning unit and the face ducts in FIG. 1.
Figure 6:
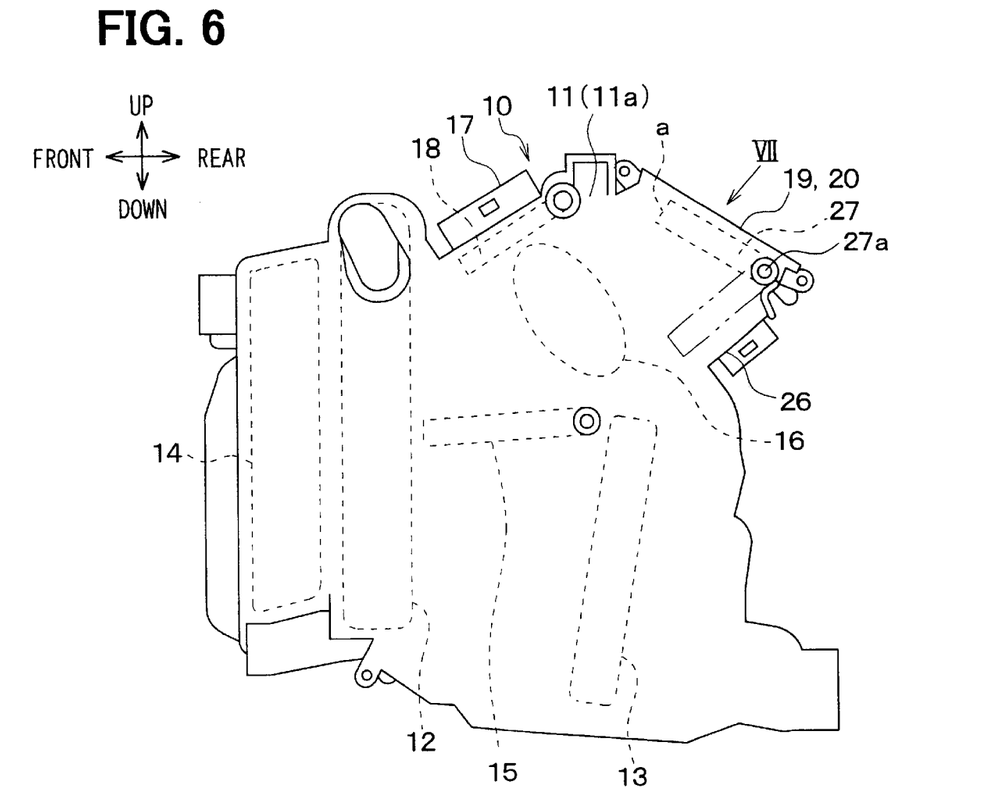
FIG. 6 is a left side view of the air conditioning unit in FIG. 4.

Inside the air conditioning case 11, as shown in FIGS. 3 and 6 by broken lines, an evaporator 12 used as a heat exchanger for cooling air, and a heater core 13 used as a heat exchanger for heating air are installed. An air inlet port 14 is provided at a frontmost position inside the air conditioning case 11, as shown in FIGS. 3 and 6. Into the air inlet port 14, air blown by the centrifugal air blower of the air blower unit is introduced.

Inside the air conditioning case 11, an evaporator 12 is disposed behind the air inlet port 14 vertically. That is, the evaporator 12 is disposed at a position directly downstream from the air inlet port 14. The evaporator 12 is one of a refrigerant cycle, and cools the blowing air by absorbing evaporation latent heat of low-pressure refrigerant from the air passing through the evaporator 12. The heater core 13 is disposed downstream from the evaporator 12 (e.g., the rear side of the evaporator 12), to have a predetermined interval with the evaporator 12.

The heater core 13 is for heating the cooled air after being passed through the evaporator 12. In the heater core 13, hot water (coolant for an engine) flows from a vehicle engine (not shown), so that air passing through the heater core 13 is heated using the hot water as a heating source.

Figure 12A:
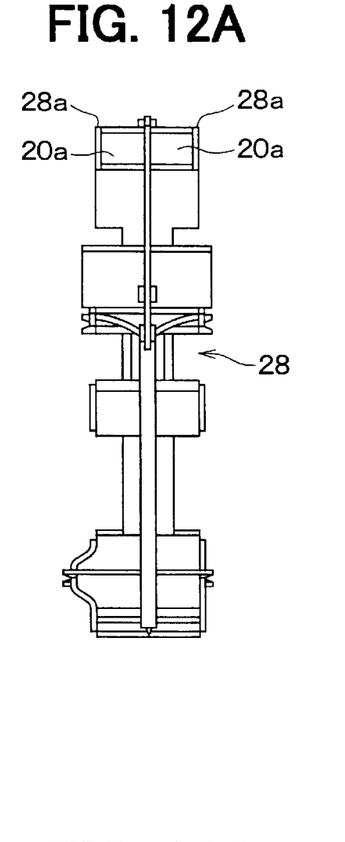
FIG. 12A is a front view showing a center partition plate of the air conditioning unit according to the first embodiment of the present invention.
Figure 12B:
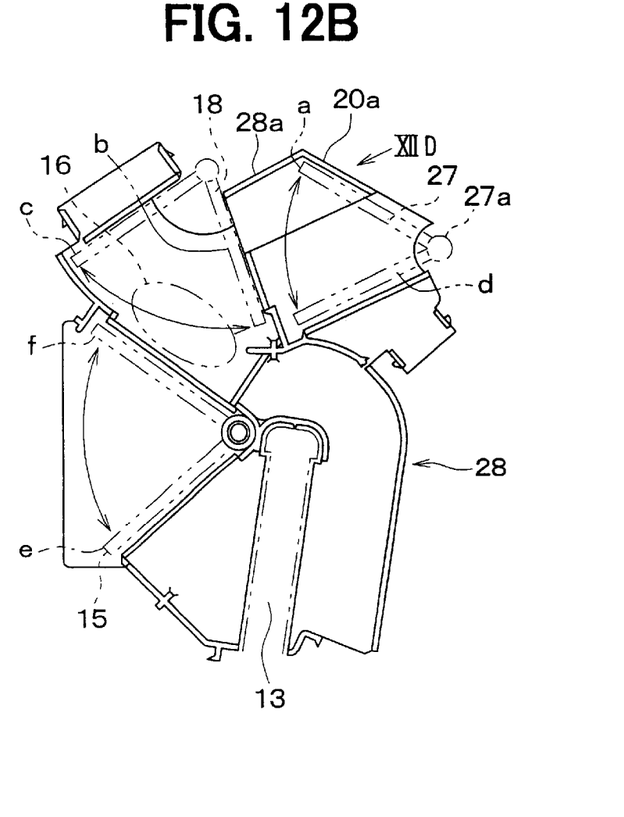
FIG. 12B is a left side view of FIG. 12A.
Figure 12C:
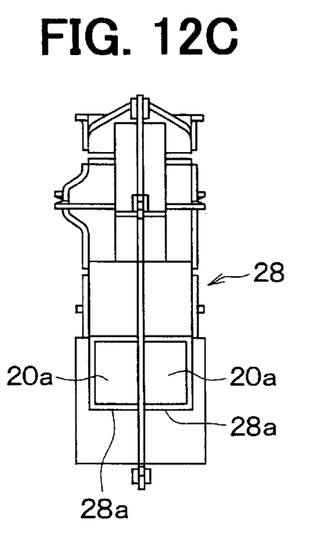
FIG. 12C is a top view of FIG. 12A.
Figure 12D:
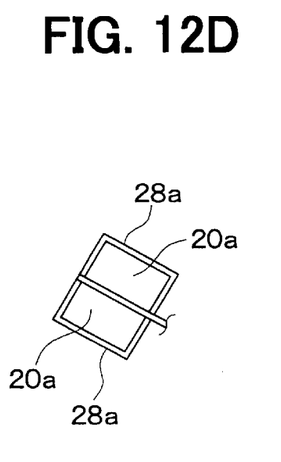
FIG. 12D is a side view when being viewed from an arrow XIID of FIG. 12B.

A partition plate 28 shown in FIGS. 12A–12C is disposed in a downstream passage downstream from the evaporator 12 within the air conditioning case 11. Therefore, the downstream passage of the evaporator 12 is partitioned into a left side passage and a right side passage. Between the evaporator 12 and the heater core 13, two flat-shaped air mix doors 15 (shown in FIGS. 3 and 6) are rotatably disposed in the left side passage and the right side passage, respectively independently. Each of the air mix doors 15 independently controls air amount distribution of the warm air from the heater core 13 and the cool air bypassing the heater core 13. Moreover, the warm air and the cool air are mixed in an air mixing portion 16 formed above the heater core 13 in each of the left side passage and right side passage, so that conditioned air having a desired temperature can be obtained in the air mixing portion 16. Thereafter, the conditioned air is blown into the passenger compartment. That is, by independently controlling the rotation positions of the air mix doors 15 in the right side passage and the left side passage, the temperature of air blown into a left side in the passenger compartment and the temperature of air blown into a right side in the passenger compartment can be independently controlled.

In an upper surface of the air conditioning case 11, a defroster opening portion 17 is formed adjacent to the air mixing portions 16. A defroster duct (not shown) is connected to the defroster opening portion. From a defroster air outlet that is the end of the defroster duct, the conditioned air is blown toward an inside surface of a vehicle front windshield. The defroster opening portion 17 is opened and closed by a plate-shaped defroster door 18 as shown in FIGS. 3 and 6.

Moreover, two center face opening portions 19 and two side face opening portions 20 are provided in a line in the vehicle right-left direction, in the upper surface of the air conditioning case 11 at a vehicle rear side of the defroster opening 17. The center face opening portions 19 are provided for blowing the conditioned air toward an upper center side in the passenger compartment, and the side face opening portions 20 are provided for blowing the conditioned air toward right and left upper sides in the passenger compartment.

Figure 4:
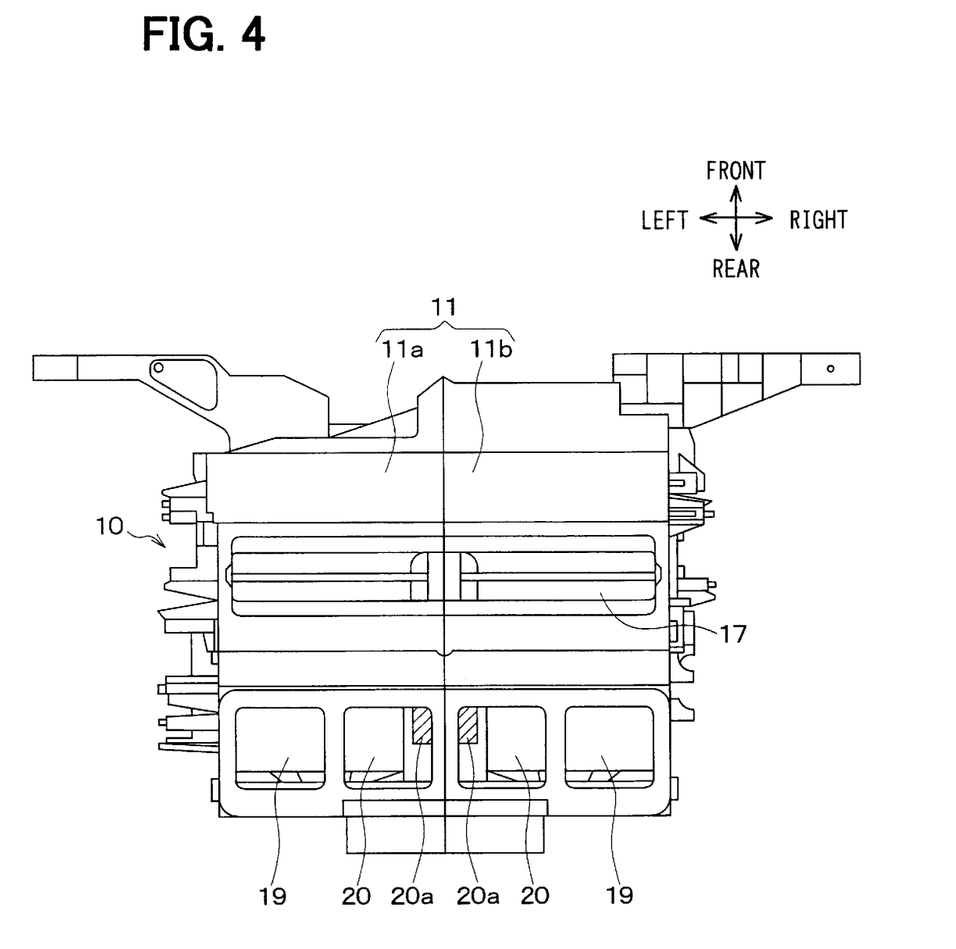
FIG. 4 is a top view showing the air conditioning unit according to the first embodiment of the present invention.
Figure 5:
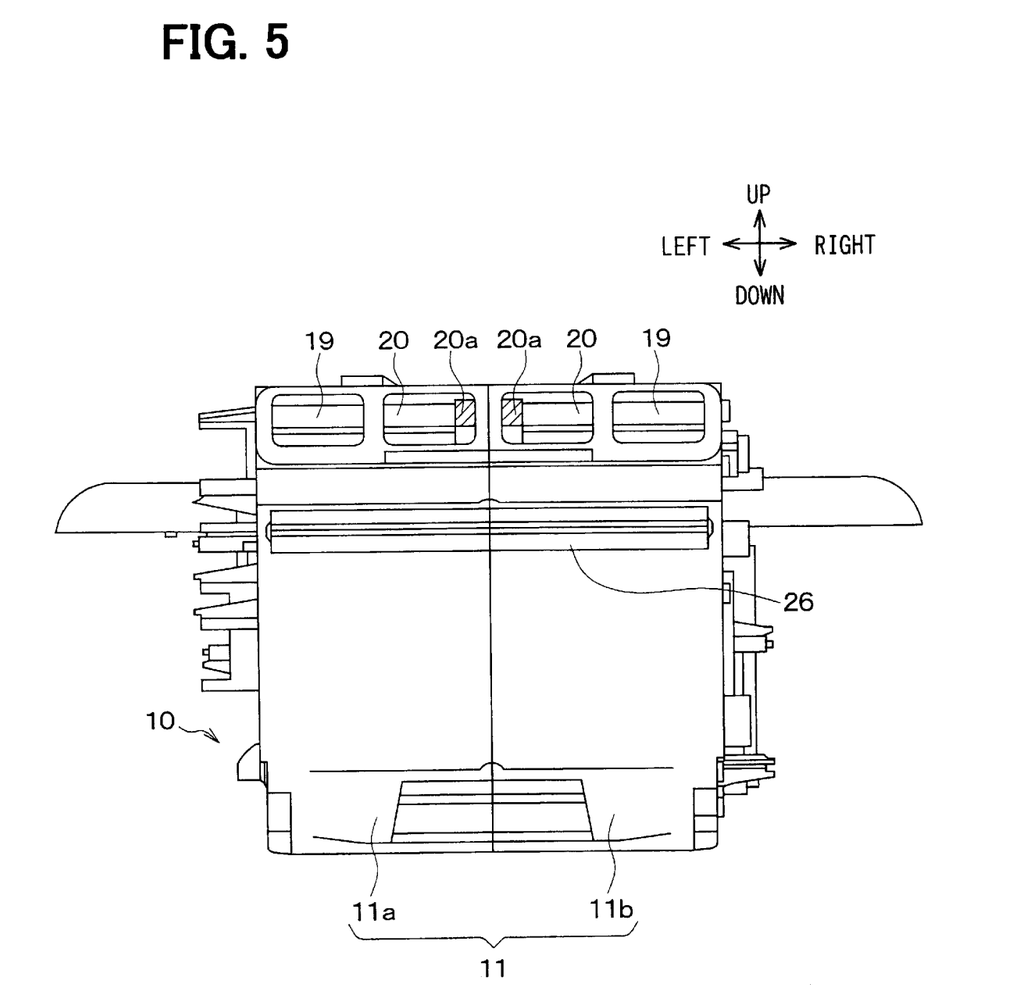
FIG. 5 is a front view of the air conditioning unit in FIG. 4.
Figure 7:
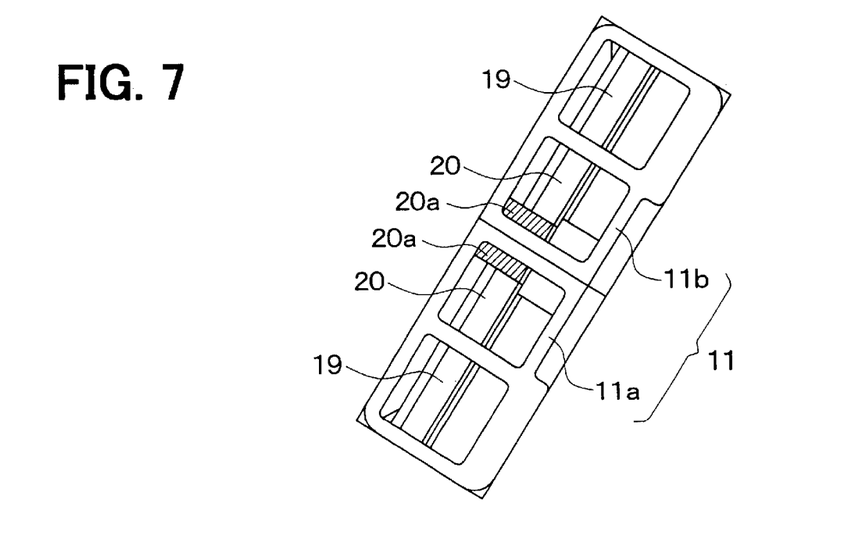
FIG. 7 is a side view when being viewed from an arrow VII in FIG. 6.

Specifically, as shown in FIGS. 4, 5, and 7, the center face opening portions 19 are provided at two end sides in the vehicle right-left direction, in the upper surface of the air conditioning case 11. Moreover, the side face opening portions 20 are formed in a center area between the center face opening portions 19 in the vehicle right-left direction, in the upper. surface of the air conditioning case 11.

Figure 1:
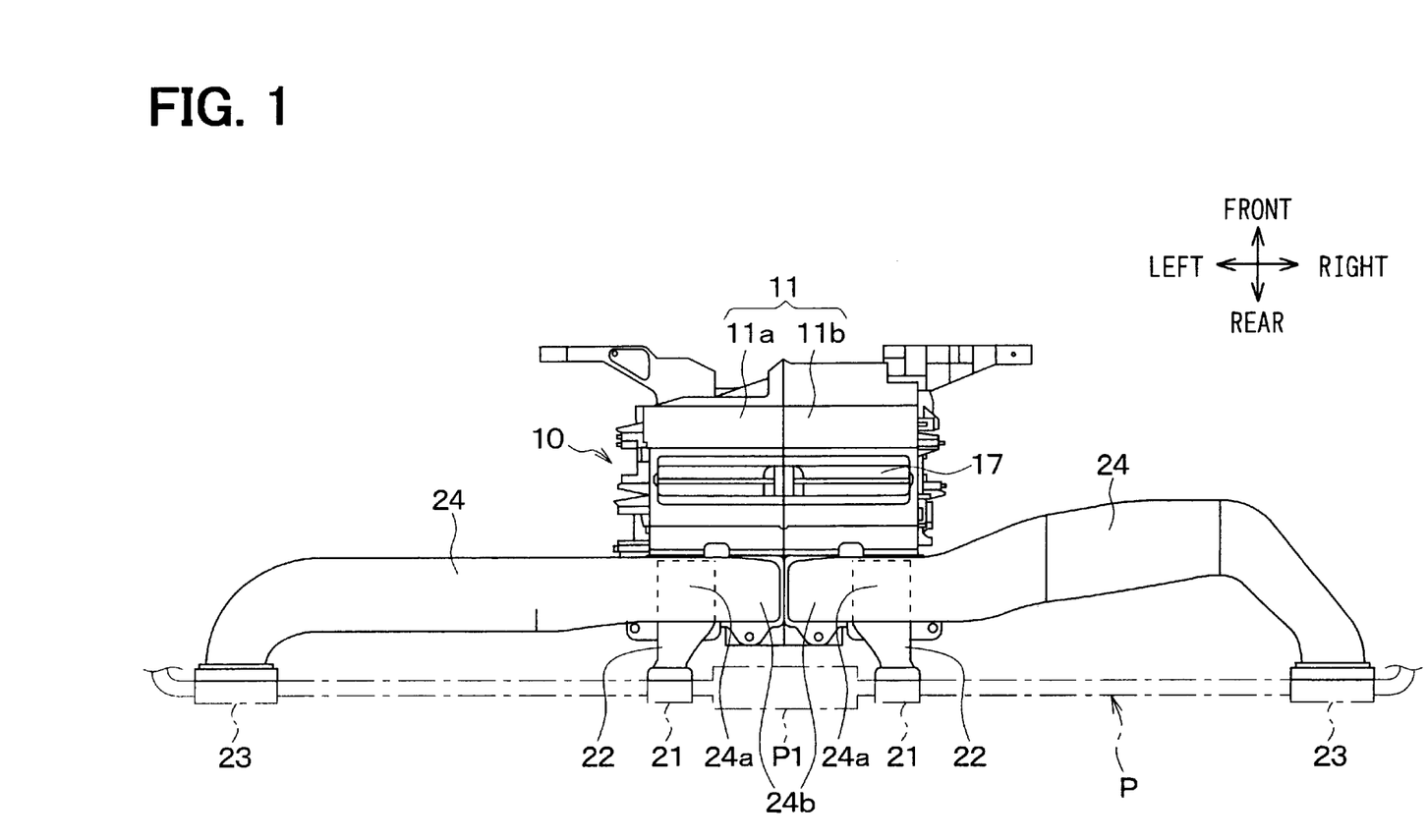
FIG. 1 is a top view showing a layout of an air conditioning unit and face ducts in a vehicle air conditioner, according to a first embodiment of the present invention.
Figure 2:
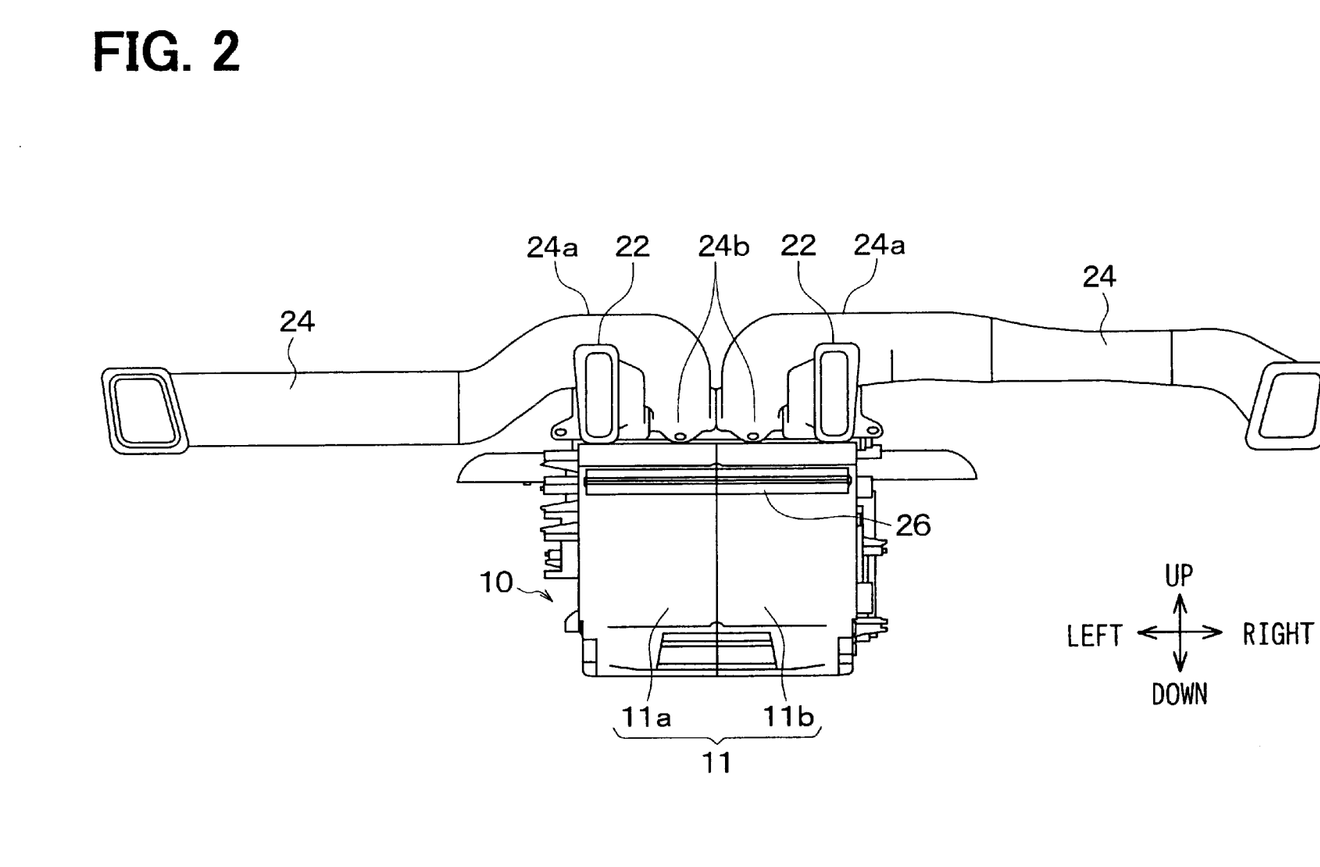
FIG. 2 is a front view showing the air conditioning unit and the face ducts in FIG. 1.
Figure 8:
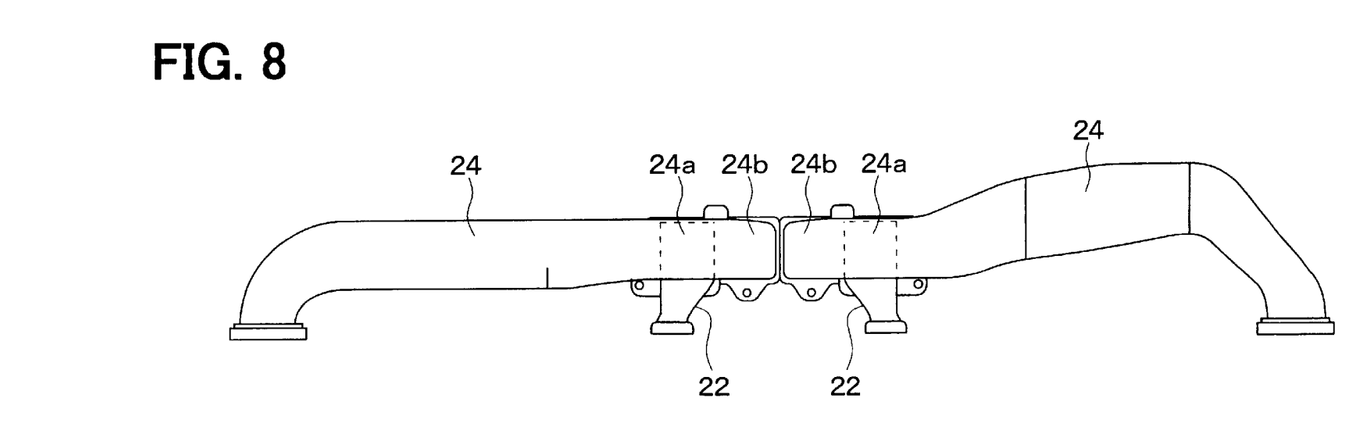
FIG. 8 is a top view showing the face dusts according to the first embodiment of the present invention.
Figure 9:
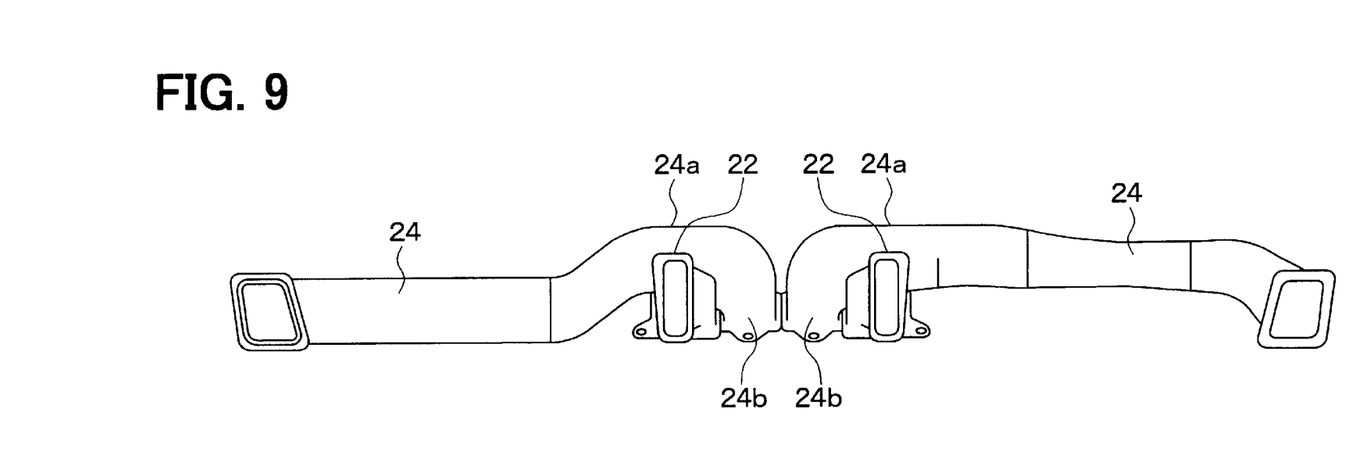
FIG. 9 is a front view showing the face dusts according to the first embodiment of the present invention.
Figure 10:
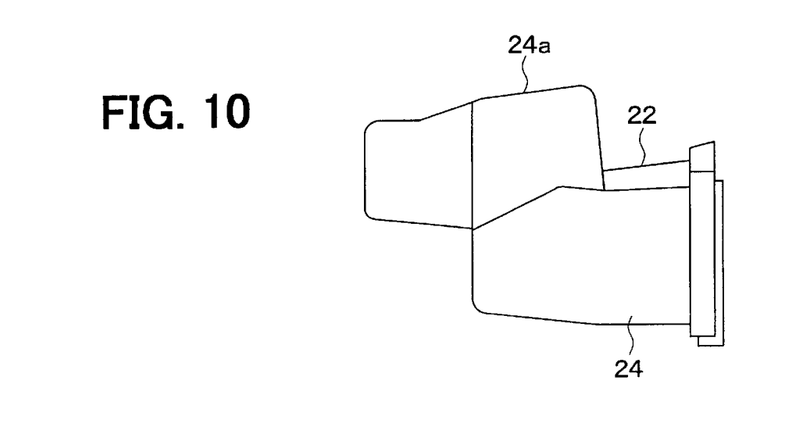
FIG. 10 is a left side view showing the face ducts according to the first embodiment of the present invention.

As shown in FIG. 1, two center face air outlets 21 are provided adjacent a center portion p1 of the dashboard P in the vehicle right-left direction. Moreover, the center face air outlets 21 are disposed generally opposite to right and left side end portions of the vehicle rear surface of the air conditioning case 11. Therefore, as shown in FIGS. 1 and 8, center face ducts 22, each of which is for connecting the center face air outlet 21 and the center face opening portion 19, can be formed substantially in a straight line to extend in the vehicle front-rear direction. The center face air ducts 22 are made of a resin. Moreover, in the center portion P1 of the dashboard P, at least one of a navigation system, an air conditioning operation panel, a radio and an ashtray can be disposed to be stacked in the vehicle up-down direction. The center face air outlets 21 are provided at two sides of the center portion P1 in the vehicle right-left direction, at positions adjacent to the center portion P1.

At two end areas of the dashboard P in the vehicle right-left direction, side face air outlets 23 are provided. The side face air outlets 23 provided in the dashboard P and the side face opening portions 20 provided in the air conditioning unit 10 are connected by side face ducts 24, respectively. The side face ducts 24 are made of resin, and are formed to extend from the center portion of the dashboard P toward the side end areas of the dashboard P in the vehicle right-left direction. Crossing portions 24a are formed in center area parts of the side face ducts 24, to pass above upper portions of the center face ducts 22 generally perpendicular to an extending direction of the center face ducts 22. Moreover, end portions 24b of the side face ducts 24 at the center in the vehicle right-left direction are disposed inside the crossing portions 24a, to be connected to the side face opening portions 20.

As known well, the center face air outlets 21 are for blowing the conditioned air from the center area of the dashboard P toward the upper side of a passenger in the passenger compartment. Moreover, the side face air outlets 23 are for blowing the conditioned air from the two right and left end areas of the dashboard P toward the upper side of the passenger in the passenger compartment. Besides, by a blowing direction control system (not shown) provided in the side face air outlets 23, the conditioned air from the side face air outlets 23 can be blown toward vehicle side glasses. Therefore, during the winter season, by blowing warm air from the side face air outlets 23 toward the vehicle side glasses, fogging of the vehicle side glasses can be prevented.

A foot opening portion 26 is provided in the air conditioning case 11 at a position lower than the two face opening portions 19 and 20. A foot air duct (not shown) is connected to the foot opening portion 26. From a foot air outlet that is a downstream end of the foot air duct, the conditioned air is blown toward foot areas of the front seats in the passenger compartment.

A flat face-foot switching door 27 is provided to be rotated around a rotation shaft 27a between the face openings 19, 20 and the foot opening 26, inside the air conditioning case 11. By the face-foot switching door 27, open and close states of the face opening portions 19 and 20 and the foot opening portions 26 can be selectively switched.

The defroster door 18 and the face-foot switching door 27 are air-outlet mode switching means for switching an air outlet mode. The defroster door 18 and the face-foot switching door 27 are connected to an output shaft of a driving motor of a common actuator system through a link system (not shown). Therefore, by the common actuator system, both the doors 18 and 19 are operatively linked with each other.

Figure 11A:
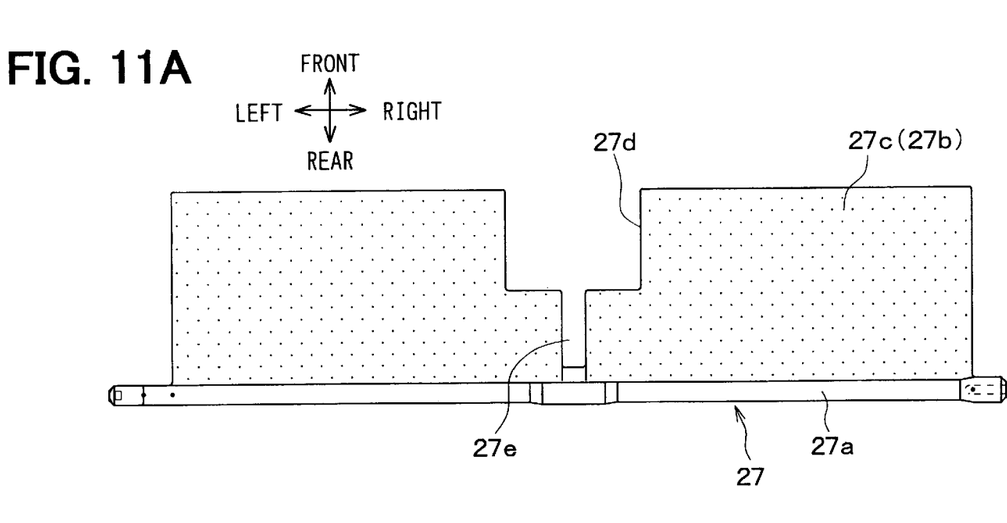
FIG. 11A is a front view of a face-foot switching door according to the first embodiment of the present invention.
Figure 11B:
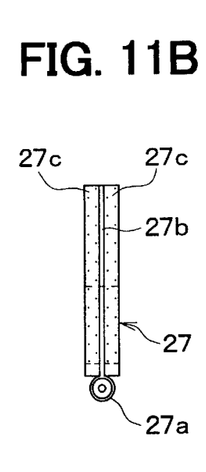
FIG. 11B is a left side view of the face-foot switching door in FIG. 11A.

A specific structure of the face-foot switching door 27 is shown in FIG. 11. The face-foot switching door 27 is provided with the rotation shaft 27a and a plate door portion 27b which are integrally molded by resin. A seal member 27c made of porous elastic material is attached to both the surfaces of the plate door portions 27b. Moreover, in the plate door portion 27b of the face-foot switching door 27, a rectangular notch 27d is formed in its middle part. Between the rectangular notch 27d and the rotation axis 27a, a slit 27e to be engaged with the center partition plate 28 is formed.

The rectangular notch 27d is for forming a normally open passage 20a in the side face opening portions 20 positioned in the center area of the air conditioning case 11 in the vehicle right-left direction. The normally open passage 20a is kept to be opened regardless of the position of the face-foot switching door 27. The normally open passage 20a (shown in FIGS. 4, 5 and 7 as diagonally shaded areas) are positioned on the center side of the side face openings 20 in the vehicle right-left direction, and on a vehicle front side in the side face opening 20 (at a front end side of the switching door 27).

When a foot mode is set, the switching door 27 is operated to the position a11 shown in FIGS. 6 and 12, and the foot opening portion 26 is fully opened. In the foot mode, even when the switching door 27 is rotated to the position "a" where the center face opening portions 19 and the side face opening portions 20 are closed, the rectangular notch 27d overlaps the normally open passage 20a in the side face opening portions 20. Therefore, the open state of the normally open passage 20a is maintained even in the foot mode.

The specific structure of the normally open passage 20a will be now described. FIGS. 12A–12D show the center partition plate 28 for partitioning the downstream passage downstream from the evaporator 12 in the air conditioning case 11 into the right side passage and the left side passage. In this embodiment, because the side face opening portions 20 are positioned in the center part of the air conditioning case 11 in the vehicle right-left direction, the center partition plate 28 is positioned in a range of the opening of the side face opening portions 20. In consideration of this point, the normally open passages 20a for the side face opening portions. 20 are formed in the center partition plate 28.

That is, ducts 28a having rectangular sectional shapes are formed by resin, integrally with an upper part of the center partition plate 28. The upper part of the center partition plate 28 corresponds to the opening portions of the side face opening portions 20, and the normally open passages 20a are formed in the ducts 28a. The ducts 28a are formed on both sides of the center partition plate 28 in the vehicle right-left direction.

In FIG. 12B, the position "b" is an operational position of the defroster door 18 in a defroster mode. When the defroster door 18 is operated to the operational position "b" in the defroster mode, air passages communicating with the center face opening portions 19, the side face opening portions 20 and the foot opening portions 26 are closed by the defroster door 18. However, the normally open passages 20a are not closed by the defroster door 18, and maintains in a communication state communicating with the air mixing portion 16.

That is, the ducts 28a are formed so that vehicle front ends of the ducts 28a is adjacent to the position "b" (a defroster mode position) of the defroster door 18. Moreover, a notch (not shown) similar to the notch 27d of the switching door 27 is formed in a center area of the defroster door 18, positioned opposite to the vehicle front ends of the ducts 28a. Therefore, even when the defroster door 18 is operated to the defroster position "b", the open state of the normally open passage 20a formed in the ducts 28a can be maintained by the notch of the defroster door 18. In this embodiment, the center partition plate 28 is inserted between the left side case 11a and the right side case 11b of the air conditioning case 11 to be fixed therebetween.

Operation of this embodiment having the above structure will be described. At first, the operation of the vehicle air conditioner in the face mode is described. In the face mode, the defroster door 18 is operated to the operation position "c" in FIG. 12B, so that air passages communicating with the center face opening portions 19, the side face opening portions 20 and the foot opening portions 26 are opened, and the defroster opening portion 17 is closed. Further, the face-foot switching door 27 is operated to the operation position "d" in FIG. 12B, so that the center face opening portions 19 and the side face opening portions 20 are opened, and the foot opening portion 26 is closed. Therefore, in the face mode, the air mixing portions 16 only communicate with the center face opening portions 19 and the side fade opening portions 20. In this case, when the air mix door 15 is operated to the position "e" shown in FIG. 12B, the air passage in the heater core 13 is closed entirely, and a cool air bypass passage above the heater core 13 is opened entirely, so that a maximum cooling state is set. In this state, when the air blower of the air blower unit and the refrigerant cycle are operated, air blown from the air blower unit flows into the air inlet port 14 positioned at the front end side of the air conditioning case 11, and is cooled in the evaporator 12.

In the maximum cooling state, the cool air from the evaporator 12 passes through the cool air bypass passage, and flows into the center face opening portions 19 and the side face opening portions 20 directly. In this case, because the normally open passage 20a formed in the right and left surfaces of the center partition plate 28 are opened regularly, some of the cool air having passed through the air mixing portion 16 passes through the normally open passage 20a and flows into the side face opening portions 20.

The cool air flowing into the center face opening portions 19 passes through the center face ducts 22, and is blown from the center face air outlets 21 of the dashboard toward the center upper side of the passenger in the passenger compartment. Similarly, cool air flowing into the side face opening portions 20 passes through the side face ducts 24, and is blown toward the side upper side of the passenger and the side window glasses.

For controlling the temperature of the air blown into the passenger compartment, when the air mix door 15 is shifted from the maximum cooling position (i.e., the position "e" shown in FIG. 12B) to a position toward a maximum heating position (i.e., the position "f" shown in FIG. 12B), a part of cool air from the evaporator 12 flows through the cool air bypass passage toward the air mixing portion 16. The other part of cool air from the evaporator 12 flows into the heater core 12 to be heated in the heater core 13, and flows toward the air mixing portion 16. Accordingly, cool air from the cool air bypass passage and warm air from the heater core 13 are mixed in the air mixing portion 16, so that conditioned air having desired temperature can be obtained.

In this embodiment, because the downstream passage in the air conditioning case 11, downstream from the evaporator 12 is partitioned by the center partition plate 28 into the right side passage and the left side passage, the two air mix doors 15 are respectively independently disposed. Therefore, the temperature of air blown toward the left side area in the passenger compartment from the left center air outlet 21 and the left side face air outlet 23 is adjusted by the left air mix door 15 in the left air mixing portion 16, and the temperature of air blown toward the right side area in the passenger compartment from the right center face air outlet 21 and the right side face air outlet 23 is adjusted by the right air mix door 15 in the right air mixing portion 16.

In this embodiment, by the operation of the defroster door 18 and the switching door 27, the other air outlet mode such as a bi-level mode, a foot mode, a defroster mode, and a foot/defroster mode can be switched.

In the bi-level mode, the center face opening portions 19, the side face opening portions 20, and the foot opening portions 26 are opened simultaneously. In the foot mode, the defroster opening portion 17 is slightly opened, and the foot opening portions 26 are opened fully. In addition, in the foot mode, the center face opening portions 19 are closed entirely, and the normally open passages 20a of the side face opening portions 20 are opened. In the defroster mode, the defroster opening portion 17 is opened fully, the foot opening portions 26 and the center face opening portions 19 are closed entirely, and the normally open passages 20a are opened.

As shown in FIG. 1, because of the design of the dashboard P, the two center face air outlets 21, which are formed around the center area of the dashboard P in the vehicle right-left direction, are positioned opposite to the right and left two end sides on the rear side surface of the air conditioning case 11, in the vehicle right-left direction. According to this embodiment of the present invention, the side face opening portions 20 are provided at the center area of the air conditioning case 11 in the vehicle right-left direction, and the center face opening portions 19 are provided at right and left end sides of the air conditioning case 11 in the vehicle right-left direction. Accordingly, each resinous center face duct 22, for connecting the center face air outlet 21 provided in the dashboard and the center face opening portion 19 provided in the air conditioning case 11, can be made substantially in a straight line to extend in the vehicle front-rear direction, as shown in FIGS. 1 and 8. Therefore, flow resistance in the center face ducts 22 can be effectively reduced, and the flow amount of air blown from the center face air outlets 21 can be increased.

In this embodiment, by arranging the side face opening portions 20 at the center area of the air conditioning unit 10 in the vehicle right-left direction, the length of each side face duct 24 becomes slightly longer. However, since the side face duct 24 generally has a length much longer than that of the center face duct 22. Therefore, even when the side face ducts are elongated slightly, the affect of the flow resistance increased in the side face ducts 24 can be omitted.

In this embodiment, since the side face opening portions 20 are disposed at the center portion of the air conditioning case 11 in the vehicle right-left direction, the center partition plate 28 is positioned in the opening range of the side face opening portions 20 in the vehicle right-left direction. Accordingly, in this embodiment, the ducts 28a for defining the normally open passages 20a of the side face opening portions 20 are formed integrally with the center partition plate 28. In this case, resin-molding structures of the right side case 11a and the left side case 11b of the air conditioning case 11 can be made simple.

If the duct 28a is formed integrally with the right side case 11a or the left side case 11b, because the duct 28a extends in the vertical direction with respective to a removing direction of the right side case 11a or the left side case 11b (in the right-left direction in FIG. 1) from a die, a special slide core is necessary for molding the ducts 28a. Generally, because the left side case 11a and the right side case 11b are main case parts in the air conditioning case 11, its shapes are very complicated. Therefore, die structures for molding the left side case 11a and the right side case 11b are complicated originally. In this case, if a slide core is added for forming the ducts 28a, the die structure for molding the cases becomes more complicated, and manufacturing cost of the molding die increases.

The shape of the center partition plate 28 is generally simple as compared with the shapes of the left side case 11a and the right side case 11b. Therefore, the molding structure of the center partition plate 28 is simple, as compared with the molding structures of the left side case 11a and the right side case 11b. Therefore, even when the slide core is need in the molding structure of the center partition plate 28, for forming the ducts 28, the molding structure of the center partition plate 28 can be made simple. Consequently, manufacturing cost of the vehicle air conditioner can be reduced.

In above-described embodiment, the side face opening portions 20 are provided in the center area of the air conditioning case 11 in the vehicle right-left direction, inside the center face opening portions 19 in the vehicle right-left direction. However, the side face opening portions 20 can be provided in the air conditioning case 11 outside the center face opening portions 19 in the vehicle right-left direction. For example, the side face opening portions 20 can be provided in right and left side surfaces of the air conditioning case 11, while the center face opening portions 19 are provided in the vehicle rear surface of the air conditioning case 11. Even in this case, the center face opening portions 19 can provided at positions more proximate to the right and left side ends of the air conditioning case 11, than the center area.

Further, in the above-described embodiment, the side face opening portions 20 and the center face opening portions 19 are arranged in a line in the vehicle right-left direction. However, the side face opening portions 20 can be positioned at front sides or rear sides of the center face opening portions 19, or can be offset from the center face opening portions 19 in the vehicle front-rear direction. Only when the center face opening portions 19 are positioned at the right and left end sides in the rear surface of the air conditioning case 11 of the air conditioning unit 10 in the vehicle right-left direction, the arrangement positions of the side face opening portions 20 can be changed.

Such changes and modifications are to be understood as being within the scope of the present invention as defined by the appended claims.

What is claimed is:

1. An air conditioner for a vehicle having a dashboard at a front side in a passenger compartment, the air conditioner comprising:

an air conditioning unit for conditioning air to be blown into the passenger compartment, the air conditioning unit being disposed behind the dashboard substantially in a center area in a vehicle right-left direction, the air conditioning unit having at least two first face openings through which air conditioned in the air conditioning unit flows toward a center upper side in the passenger compartment, and at least two second face openings through which air conditioned in the air conditioning unit flows toward right and left upper sides in the passenger compartment;

two first face ducts through which the first face openings are coupled to first face outlets that are provided in the dashboard at positions adjacent to a center portion in the vehicle front-rear direction; and two second face ducts through which the second face openings are coupled to second face outlets that are provided in the dashboard at right and left end sides, wherein:

the first face outlets are arranged at positions opposite to right and left end sides of the air conditioning unit; and the first face openings are provided in the air conditioning unit at the right and left end sides in the vehicle right-left direction.

2. The air conditioner according to claim 1, wherein:

the second face openings are provided in the air conditioning unit at a center area in the vehicle right-left direction; and the first face openings are provided in the air conditioning unit at right and left sides of the second face openings in the vehicle right-left direction.

3. The air conditioner according to claim 1, wherein each of the first face ducts extends substantially straightly in a vehicle front-rear direction.

4. The air conditioner according to claim 1, wherein:
the second face ducts have crossing portions which pass above the first face ducts to cross extending directions of the first face ducts; and
the second face ducts have end opening portions that are connected to the second face openings inside the crossing portions in the vehicle right-left direction.

5. The air conditioner according to claim 1, wherein:
the air conditioning unit includes an air conditioning case defining an air passage through which air flows into the first and second face openings, and a partition plate that is disposed in the air conditioning case to partition the air passage into a first passage and a second passage in the vehicle right-left direction;
the air passage has a normally open passage through which air conditioned in the air conditioning unit is always introduced to the second face openings; and
the normally open passage is provided in the partition plate.

6. The air conditioner according to claim 1, wherein:
the center portion of the dashboard has at least one of a navigation system, an air conditioning operation panel, a radio and an ashtray; and
the first face outlets are provided in the dashboard adjacent to the center portion outside the center portion in the vehicle tight-left direction.

7. The air conditioner according to claim 1, wherein the second face openings are provided in the air conditioning unit outside the first face openings in the vehicle right-left direction.

* * * * *